(12) United States Patent
Senshu

(10) Patent No.: US 8,848,496 B2
(45) Date of Patent: Sep. 30, 2014

(54) INFORMATION PROCESSING APPARATUS, SOFTWARE INSTALLING METHOD, AND RECORDING MEDIUM

(75) Inventor: Susumu Senshu, Kanagawa (JP)

(73) Assignee: Sony Corporation, Tokyo (JP)

( * ) Notice: Subject to any disclaimer, the term of this patent is extended or adjusted under 35 U.S.C. 154(b) by 913 days.

(21) Appl. No.: 13/017,116

(22) Filed: Jan. 31, 2011

(65) Prior Publication Data

US 2011/0126279 A1    May 26, 2011

Related U.S. Application Data

(62) Division of application No. 11/554,910, filed on Oct. 31, 2006, now Pat. No. 8,120,997.

(30) Foreign Application Priority Data

Nov. 9, 2005    (JP) .................................. 2005-325269

(51) Int. Cl.
| | |
|---|---|
| G11B 3/70 | (2006.01) |
| G11B 20/10 | (2006.01) |
| G11B 20/00 | (2006.01) |
| G11B 23/28 | (2006.01) |

(52) U.S. Cl.
CPC .............. *G11B 23/284* (2013.01); *G11B 20/10* (2013.01); *G11B 20/00876* (2013.01); *G11B 20/0021* (2013.01); *G11B 20/00492* (2013.01); *G11B 20/00282* (2013.01); *G11B 20/00275* (2013.01); *G11B 20/00086* (2013.01)
USPC .............................. 369/14; 369/53.21; 726/31

(58) Field of Classification Search
USPC ............ 726/26, 27, 30, 31, 33; 717/168, 169, 717/174, 175; 369/53, 21
See application file for complete search history.

(56) References Cited

U.S. PATENT DOCUMENTS

| | | | | |
|---|---|---|---|---|
| 6,044,046 A | * | 3/2000 | Diezmann et al. | 369/14 |
| 6,226,747 B1 | * | 5/2001 | Larsson et al. | 726/31 |

(Continued)

FOREIGN PATENT DOCUMENTS

| | | | |
|---|---|---|---|
| JP | 03-091834 | * | 4/1991 |
| JP | 09-044382 | * | 2/1997 |

(Continued)

OTHER PUBLICATIONS

Kayaoka, Machine generated translation of JP 09-044382, Feb. 1997.*

(Continued)

*Primary Examiner* — David Harvey
(74) *Attorney, Agent, or Firm* — Oblon, Spivak, McClelland, Maier & Neustadt, L.L.P.

(57) ABSTRACT

A recording medium comprises an IC chip including circuitry configured to record data of one or more kinds of software, transmit and receive information to and from an external apparatus without contacting the external apparatus, and communicate with the external apparatus and execute mutual authentication processing for permitting access to the recorded information. The data recorded on the circuitry includes identification information for respective kinds of software recorded on a recording surface of the recording medium, key information necessary for installation of the respective kinds of software, and usage control information indicating a number of installations available for installation of the respective kinds of software. The key information is readout to the external apparatus and the usage information is rewritten by the external apparatus only when mutual authentication is correctly performed between the IC chip and the external apparatus.

9 Claims, 14 Drawing Sheets

(56) References Cited

U.S. PATENT DOCUMENTS

| | | | |
|---|---|---|---|
| 6,680,897 B2 * | 1/2004 | Ono et al. | 369/273 |
| 6,938,121 B2 * | 8/2005 | Shigetomi et al. | 711/112 |
| 7,038,985 B2 * | 5/2006 | Ryal | 369/53.21 |
| 7,167,562 B2 * | 1/2007 | Milgram | 380/256 |
| 7,317,396 B2 * | 1/2008 | Ujino | 340/572.1 |
| 7,457,227 B2 * | 11/2008 | Senshu et al. | 369/273 |

FOREIGN PATENT DOCUMENTS

| | | | |
|---|---|---|---|
| JP | 11-250192 | | 9/1999 |
| JP | 2000-285592 | | 10/2000 |
| JP | 2003-22140 | | 1/2003 |
| JP | 2003-316966 | | 11/2003 |
| JP | 2004-110588 | | 4/2004 |
| JP | 2004-247799 | | 9/2004 |
| JP | 2005-71575 | * | 3/2005 |
| JP | 2005-190514 | | 7/2005 |
| JP | 2005-302135 | | 10/2005 |
| WO | WO 2004/075092 | * | 9/2004 |

OTHER PUBLICATIONS

Office Action issued Apr. 12, 2011 in Japanese Patent Application No. 2005-325269.

* cited by examiner

BEFORE INSTALLATION

AFTER INSTALLATION OF SOFTWARE FILE A

BEFORE REWRITING

AFTER REWRITING

INFORMATION PROCESSING APPARATUS, SOFTWARE INSTALLING METHOD, AND RECORDING MEDIUM

CROSS-REFERENCES TO RELATED APPLICATIONS

This application is a divisional of U.S. application Ser. No. 11/554,910 filed Oct. 31, 2006, entitled, "Information Processing Apparatus, Software Installing Method, and Recording Medium," which claims priority based on Japanese Patent Application JP 2005-325269 filed in the Japanese Patent Office on Nov. 9, 2005. The entire contents of the Japanese patent application No. 2005-325269 and U.S. application Ser. No. 11/554,910 are incorporated herein by reference.

BACKGROUND OF THE INVENTION

1. Field of the Invention

The present invention relates to an information processing apparatus that includes a recording media drive and is capable of installing and executing software, a software installing method for installing the software, and a recording medium having the software recorded therein.

2. Description of the Related Art

In recent years, an optical disk has been widely spread as one of portable recording media. For example, music contents, video contents, and software for computers are often recorded in optical disks and provided to users. Data of the music contents and video contents provided by the optical disks are read and reproduced, for example, by a dedicated reproducing apparatus. Alternatively, it is also possible to reproduce the data of the contents on a PC (personal computer) by executing reproduction software in the PC.

In the case of the software for computers (e.g., an application program), various program modules, libraries, data and the like constituting the software are recorded in an optical disk and provided to a user in a packaged state. Such a software package may be recorded as a compressed file. The software package is read from the optical disk and temporarily copied to the inside of a computer. Then, decompression, various kinds of setting processing, and the like are executed to install the software in the computer. According to the installation processing, the software is stored in the computer and brought into an executable state.

As such digital contents and software are widely circulated, providers of the digital contents and the software strongly demand that illegal copy of data protected by copyrights should be surely prevented. In response to such demands, in optical disks in the past, an ID peculiar to a disk or a stamper is recorded for each optical disk in an unrewritable state and data of contents is encrypted by a key using the ID and recorded.

Explaining a Blu-ray Disc (Registered Trademark of Sony Corporation: hereinafter abbreviated as BD) as an example, in the case of a rewritable optical disk (hereinafter referred to as RW (Rewritable) disk), the ID is recorded in an area called a BCA (Burst Cutting Area). In the case of a read only optical disk (hereinafter referred to as RO (Read Only) disk), the ID is recorded as a so-called ROM (Read Only Memory) mark. In this way, the ID is recorded on an optical disk in a state in which general users are incapable of easily reading and copying the ID. Consequently, for example, when recorded data of the optical disk is directly copied to another recording medium in bit units (called bit by bit copy), since it is difficult to generate a key for decryption from a recording medium at a copy destination, it is possible to make the data on the recording medium unusable.

However, even when such measures are applied, it is difficult to say that illegal copy can be completely prevented. For example, if there is an apparatus that is capable of reading the BCA and the ROM mark at a signal level, the BCA and the ROM mark are copied and a new optical disk is manufactured by copying information in a data area bit by bit. Data of contents recorded in this optical disk is made reproducible. If there is an apparatus that can copy an optical disk itself, a new optical disk is manufactured and the contents of the optical disk is made reproducible in the same manner.

In the case of the BD, data called RKB (Renewal Key Block) is recorded in a data area in advance and a media key is generated by processing called process RKB using this RKB and a device ID peculiar to each recorder, each player, or each manufacturer of the recorder or the player. A block key is generated using this media key and a disk ID or a stamper ID and data of contents is decrypted using this block key. This makes it possible to eliminate illegal devices that are not legally licensed by the copyright protection technique. However, even in this case, when the data of the contents encrypted using the block key and the RKB are copied bit by bit and the BCA and the ROM mark are copied to manufacture a new optical disk or an optical disk itself is copied, it is possible to reproduce contents in this optical disk.

In this way, when information used for encryption of the data of the contents is simply recorded in the optical disk, if the information is copied by some method, it is difficult to prevent use of the contents illegally copied. To cope with this problem, it is considered to mount a non-contact IC chip, copy of which is difficult and illegal readout of which is prevented by a function for mutual authentication with a reproducing apparatus side, on an optical disk and a decryption key is recorded in this IC chip to prevent an illegal reproduction operation (see, for example, JP-A-2005-190514 (paragraphs 0024 to 0028 and FIG. 6).

SUMMARY OF THE INVENTION

When software is provided using a recording medium, even if content of the recording medium is not copied, it is possible to illegally install the software in other computers if the recording medium is lent from a regular user to other users. In the case of the RW disk, usage control information indicating a right of use of a user is recorded in a data area to make possible to update the usage control information according to installation. However, it is possible to install data many times by backing up the data in a state before use (in this case, installation) in advance and returning the backup data after the installation.

Moreover, in particular, for consumer appliances, it is desired to make it possible to surely prevent illegal installation and surely manage a right of use of a user and prevent convenience for the user from being spoiled as much as possible by, for example, making operation at the time of installation simple and easy to understand.

However, a system and an installation procedure satisfying all of such conditions have not been devised.

Therefore, it is desirable to provide an information processing apparatus in which illegal installation of software is surely prevented and convenience for a user at the time of installation is improved.

It is also desirable to provide a recording medium in which illegal installation of software is surely prevented.

It is also desirable to provide a software installing method in which illegal installation of software is surely prevented and convenience for a user at the time of installation is improved.

According to an embodiment of the invention, there is provided an information processing apparatus that includes a recording media drive and is capable of installing and executing software. The information processing apparatus includes: a communication unit that transmits and receives information to and from an IC chip, which is provided in a recording medium, in a non-contact manner; an authentication processing unit that executes mutual authentication processing with the IC chip for obtaining permission of access to recorded information of the IC chip through the communication unit; a list-display-screen outputting unit that reads identification information for identifying one or more kinds of software recorded in a data area of the recording medium, respectively, and usage control information indicating possibility of installation of the respective kinds of software from the IC chip on the recording medium via the communication unit and causes a display to display a list display screen on which software names corresponding to the identification information read and the usage control information corresponding thereto are displayed as a list; a selection input unit that receives a selection input from a user according to the list display screen; a software reading unit that reads data of software selected according to the selection input from the data area of the recording medium via the recording media drive; an installation processing unit that causes the authentication processing unit to execute authentication processing with the IC chip, when the information processing apparatus is correctly authenticated, reads key information necessary for installing the software read by the software reading unit from the IC chip via the communication unit, and executes installation processing for the software using the key information read; and a usage-control-information updating unit that accesses the IC chip via the communication unit after start of the installation processing and updates the usage control information corresponding to the software being installed.

In such an information processing apparatus, software is installed from the recording medium mounted with the IC chip that is capable of reading out and writing information in a non-contact manner. In the IC chip, at least the identification information for identifying one or more kinds of software recorded in the data area of the recording medium, respectively, the usage control information indicating possibility of installation of the respective kinds of software, and the key information necessary for installing the respective kinds of software are recorded.

The list-display-screen outputting unit reads the identification information and the usage control information of the respective kinds of software recorded in the data area of the recording medium from the IC chip on the recording medium via the communication unit and causes the display to display a list display screen on which software names corresponding to the identification information read and the usage control information corresponding thereto are displayed as a list. The selection input unit receives a selection input from a user according to the list display screen. The software reading unit reads data of software selected according to the selection input from the data area of the recording medium via the recording media drive. The installation processing unit causes the authentication processing unit to execute mutual authentication processing for obtaining permission of access to the IC chip, when the information processing apparatus is correctly authenticated, reads the key information necessary for installing the software read by the software reading unit from the IC chip via the communication unit, and executes installation processing for the software using the key information read. The usage-control-information updating unit accesses the IC chip via the communication unit after start of the installation processing and updates the usage control information corresponding to the software being installed.

According to another embodiment of the invention, there is provided a recording medium from which a recording signal is reproduced according to return light obtained by irradiating a laser beam on a recording surface thereof. The recording medium is provided with an IC chip including: a recording unit that records information; a communication unit that transmits and receives information to and from an external apparatus in a non-contact manner; and an authentication processing unit that communicates with the external apparatus via the communication unit and executes mutual authentication processing for permitting access to recorded information of the recording unit. Data of one or more kinds of software is recorded on the recording surface. In the recording unit of the IC chip, at least identification information for the respective kinds of software recorded on the recording surface, key information necessary for installation of the respective kinds of software, and usage control information indicating possibility of installation of the respective kinds of software are recorded. Only when mutual authentication is correctly performed between the IC chip and the external apparatus by the authentication processing unit, readout of the key information to the external apparatus is allowed. Only when mutual authentication is correctly performed between the IC chip and the external apparatus by the authentication processing unit, rewriting of the usage control information from the external apparatus is allowed.

In such a recording medium, one or more kinds of software, for installation of which key information is necessary, are recorded in the data area of the recording medium. The key information, the identification information of the respective kinds of software, and the usage control information indicating possibility of installation of the respective kinds of software are recorded in the IC chip provided on the recording medium. The IC chip can transmit and receive information to and from an external apparatus using the communication unit in a non-contact manner and can perform mutual authentication for permitting access to recorded information with the external apparatus using the authentication processing unit. Only when mutual authentication is correctly performed between the IC chip and the external apparatus, readout of the key information to the external apparatus is allowed. Only when mutual authentication is correctly performed between the IC chip and the external apparatus, rewriting of the usage control information is allowed.

In the information processing apparatus according to an embodiment of the invention, the key information necessary for installing software recorded in the data area of the recording medium is recorded in the IC chip provided in the recording medium and, only when mutual authentication is correctly performed with the IC chip, it is possible to read out the key information and use the key information for installation processing for the software. Thus, it is possible to surely prevent illegal installation of the software. In a state in which mutual authentication is performed after start of the installation processing, the usage control information in the IC chip corresponding to the software installed is updated. Thus, it is possible to safely manage a right of installation of the software by a user.

Moreover, before the installation processing, the identification information and the usage control information of the software are read from the IC chip and software names and the usage control information are displayed as a list on the basis of the identification information and the usage control information to allow the user to select, on the basis of the list display, software to be installed. Thus, the user can check software that can be installed and surely select desired software without reading information from the data area of the recording medium. Therefore, the user can surely install the desired software without performing unnecessary operation and convenience for the user is improved.

In the recording medium according to another embodiment of the invention, the key information necessary for installing software recorded in the data area of the recording medium is recorded in the IC chip provided in the recording medium. Only when mutual authentication is correctly performed with an external apparatus, the external apparatus is allowed to read out the key information and use the key information for installation processing for software. Thus, it is possible to surely prevent illegal installation of the software. In addition, only when mutual authentication is correctly performed with the external apparatus, the external apparatus is allowed to rewrite the usage control information recorded in the IC chip. Thus, it is possible to safely manage a right of installation of software corresponding to the usage control information by a user.

DESCRIPTION OF THE PREFERRED EMBODIMENTS

Embodiments of the invention will be hereinafter explained with reference to the drawings.

First Embodiment

Figure 1:
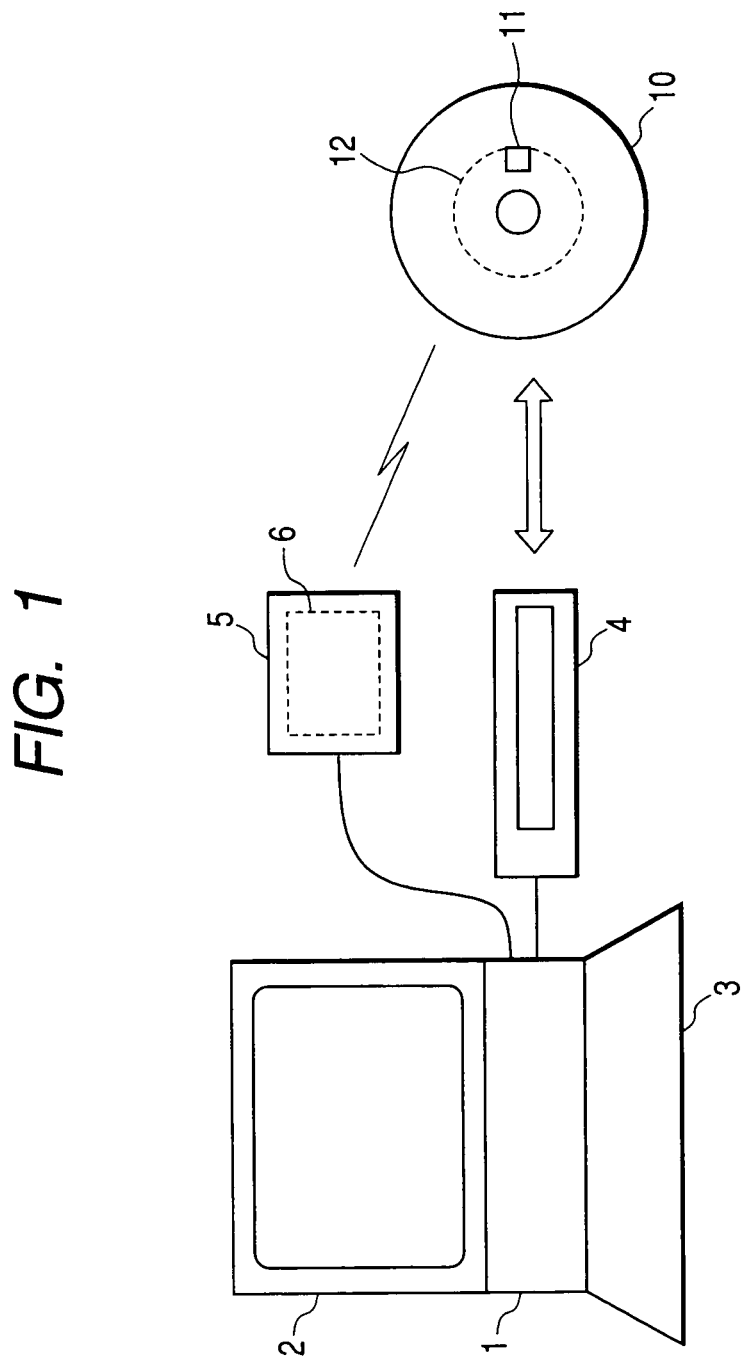
FIG. 1 is a diagram schematically showing structures of an information processing apparatus and an optical disk according to a first embodiment of the invention.

FIG. 1 is a diagram schematically showing structures of an information processing apparatus and an optical disk according to a first embodiment of the invention.

An information processing apparatus 1 shown in FIG. 1 is a computer such as a PC and includes a CPU (Central Processing Unit) and various storage devices. A display 2, a keyboard 3, an optical disk drive 4, and the like are connected to the information processing apparatus 1 and used. The optical disk drive 4 may be built in the information processing apparatus 1 or may be connected on the outside via a communication I/F (interface).

Moreover, an IC chip R/W (reader/writer) 5 is connected to the information processing apparatus 1. In this embodiment, as an example, the IC chip R/W 5 is provided on the outside via the communication I/F. The IC chip R/W 5 includes an antenna 6 and transmits and receives data to and from an IC chip 11 mounted on the optical disk 10 in a non-contact manner. Besides such a form, the IC chip R/W 5 may be provided integrally with the information processing apparatus 1 in a state in which an R/W unit is exposed on an outer surface of the information processing apparatus 1. For example, the IC chip R/W 5 may be provided on a front surface of a disk tray of the optical disk drive 4. Alternatively, the IC chip R/W 5 may be provided in the inside of the optical disk drive 4 or on the disk tray such that the information processing apparatus 1 can perform communication with the optical disk 10 kept inserted therein.

On the other hand, the optical disk 10 is a recording medium for providing a user with software such as an application program and a device driver executed in the information processing apparatus 1. In a data area (i.e., an area in which reading and writing are performed by a laser beam) on the optical disk 10, the software is recorded as a file in a state in which various program modules, libraries, data, and the like constituting the software are packaged. The file is hereinafter referred to as "software file". It is possible to store plural such software files in the data area of the optical disk 10.

The software file is a file of a state before being expanded into the inside of the information processing apparatus 1 such as a state called self-extraction file including compressed data obtained by compressing the packaged file and an expansion program for the compressed data or a state in which the packaged file is encrypted. In order to expand the software file, key information of an installation key for starting installation processing such as decompression and expansion and a decryption key for decrypting the encrypted file and the like is necessary.

Moreover, a so-called RFID (Radio Frequency Identification) tag including the IC chip 11 and an antenna 12 is mounted on the optical disk 10. The IC chip 11 and the antenna 12 are provided, for example, on an inner peripheral side of the data area of the optical disk 10. The IC chip 11 includes a memory that stores various data and a processing circuit that has a function for reading and writing processing of the data and a function for mutual authentication with the outside. The IC chip 11 does not have a built-in battery and is capable of receiving a radio wave or a magnetic field from the R/W in the antenna 12 to convert the radio wave or the magnetic field into an electromotive force and exchanging data with the R/W in a non-contact manner through the antenna 12.

In the IC chip 11, as described later, identification information of the software file recorded in the data area, key information (an installation key or a decryption key) for installing the software, usage control information indicating possibility of installation and the number of times installation can be performed, and the like are stored. An authentication key and the like necessary for mutual authentication processing with the outside are also stored in the IC chip 11.

It is extremely difficult to copy the IC chip 11. Thus, it is possible to prevent reading and writing of recorded information by an illegal device using the function for mutual authentication. In this embodiment, the information described above is recorded in the IC chip 11 to make it difficult to install the information unless the information is used from a regular device. This makes it possible to prevent illegal installation of the software in the data area and safely manage a right of the installation.

However, when the optical disk 10 including such an IC chip 11 is used, although the effects described above are obtained, it is likely that convenience for a user is spoiled. For example, when the IC chip R/W 5 is provided in the inside of the optical disk drive 4, until reading of the IC chip 11 is started after the optical disk 10 is mounted on the optical disk drive 4, it is difficult for the user to learn whether installation of the software in the optical disk 10 is permitted.

In the inside of the optical disk drive 4, there are many factors that deteriorate a communication state with the IC chip 11 such as a magnet for chucking of the optical disk 10. Therefore, it is necessary to assume a case in which the IC chip R/W 5 is connected on the outside of the optical disk drive 4 and used as shown in FIG. 1. However, in this case, naturally, it is necessary to remove the optical disk 10 from the optical disk drive 4 in order to read or write the recorded information in the IC chip 11. Thus, it is likely that operation for installation is confused.

Thus, in this embodiment, there is provided an installation procedure that can surely prevent illegal installation and completely manage a right of the installation without spoiling convenience for a user in various system configurations including the case in which the IC chip R/W 5 is provided on the outside of the optical disk drive 4.

Figure 2:
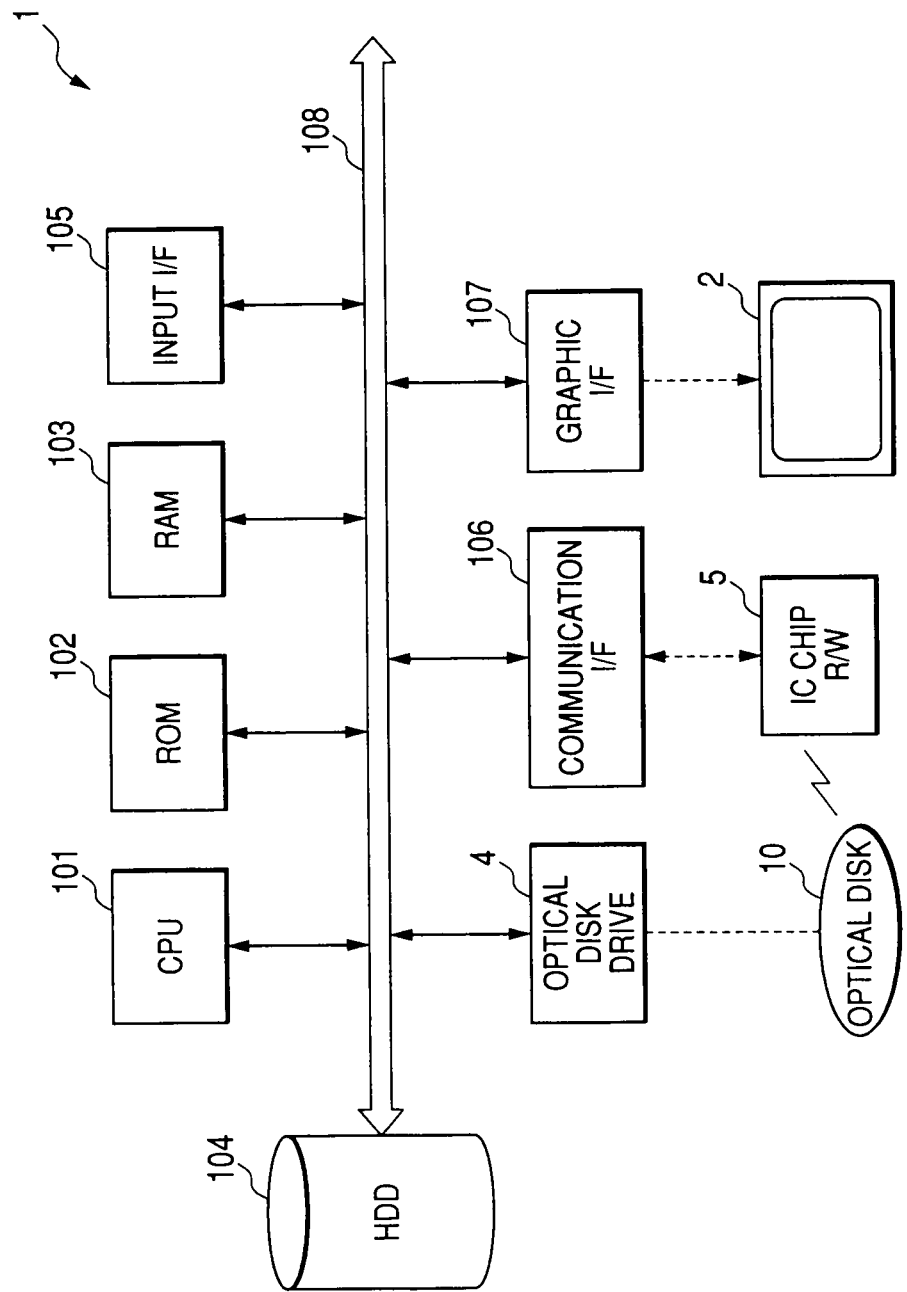
FIG. 2 is a block diagram showing a hardware configuration of the information processing apparatus according to the first embodiment.

FIG. 2 is a block diagram showing a hardware configuration of the information processing apparatus.

As shown in FIG. 2, the information processing apparatus 1 includes a CPU 101, a ROM 102, a RAM (Random Access Memory) 103, an HDD (Hard Disk Drive) 104, an optical disk drive 4, an input I/F 105, a communication I/F 106, and a graphic I/F 107. These devices are connected to one another via an internal bus 108.

The CPU 101 manages control over the entire information processing apparatus 1. The ROM 102 stores various programs such as a start program for the information processing apparatus 1 and data. The RAM 103 temporarily stores at least a part of programs to be executed by the CPU 101 and various data necessary for processing according to the programs. An OS (Operating System), application programs, and various data are stored in the HDD 104. In this embodiment, an installation program for installing software is stored in the HDD 104. The optical disk drive 4 writes data in the optical disk 10 and reads data from the optical disk 10.

Input devices such as a keyboard 3 and a mouse (not shown) are connected to the input I/F 105. The input I/F 105 transmits signals from the input devices to the CPU 101 via the internal bus 108. The communication I/F 106 is an I/F circuit for performing data transmission to and from peripheral devices conforming to the USB (Universal Serial Bus) standard or the like. In this embodiment, the IC chip R/W 5 is connected to the communication I/F 106 via a cable. A display 2 is connected to the graphic I/F 107. The graphic I/F 107 displays an image on a screen of the display 2 in accordance with an instruction from the CPU 101.

Figure 3:
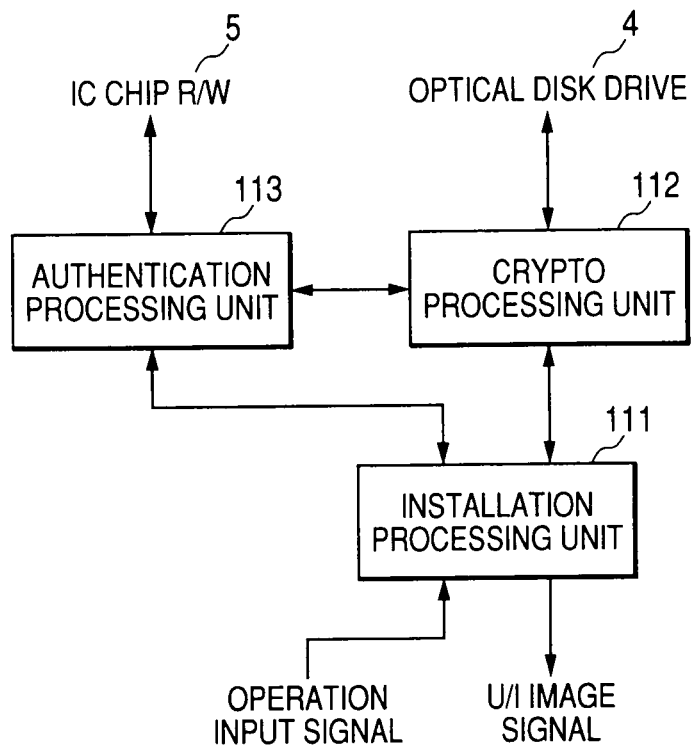
FIG. 3 is a block diagram showing a function for software installation provided in the information processing apparatus according to the first embodiment.

FIG. 3 is a block diagram showing functions for software installation provided in the information processing apparatus. The functions shown in FIG. 3 are realized by causing the CPU 101 to execute the installation program stored in the HDD 104.

In FIG. 3, an installation processing unit 111 executes a series of installation processing such as expansion and various settings for a software file read out from the optical disk 10 by the optical disk drive 4 and supplied through an crypto processing unit 112. The installation processing unit 111 generates a signal of a U/I (user interface) image such as a list display screen or a guide screen of software described later, supplies the signal to the graphic I/F 107, and causes the display 2 to display the U/I image. The install processing unit 111 executes installation processing according to an operation input signal inputted through the input I/F 105 according to the image displayed.

When a file of software read from the optical disk 10 is encrypted (i.e., when a software encryption file is read), the crypto processing unit 112 decrypts the file and supplies the file to the install processing unit 111.

When communication is performed with the IC chip 11 mounted on the optical disk 10 via the IC chip R/W 5, according to a request of the installation processing unit 111, the authentication processing unit 113 executes the mutual authentication processing with the IC chip 11 and judges whether the optical disk 10 is proper as a communication partner. When it is judged that the optical disk 10 is proper, the authentication processing unit 113 permits access to (readout of data from and writing of data in) the IC chip 11 through the IC chip R/W 5.

A part or all of these functions may be realized as hardware connected to the internal bus 108. It is desirable that the installation program for realizing these functions is recorded in a state in which alteration from the outside is prevented, for example, recorded in a recording area dedicated for readout.

Figure 4:
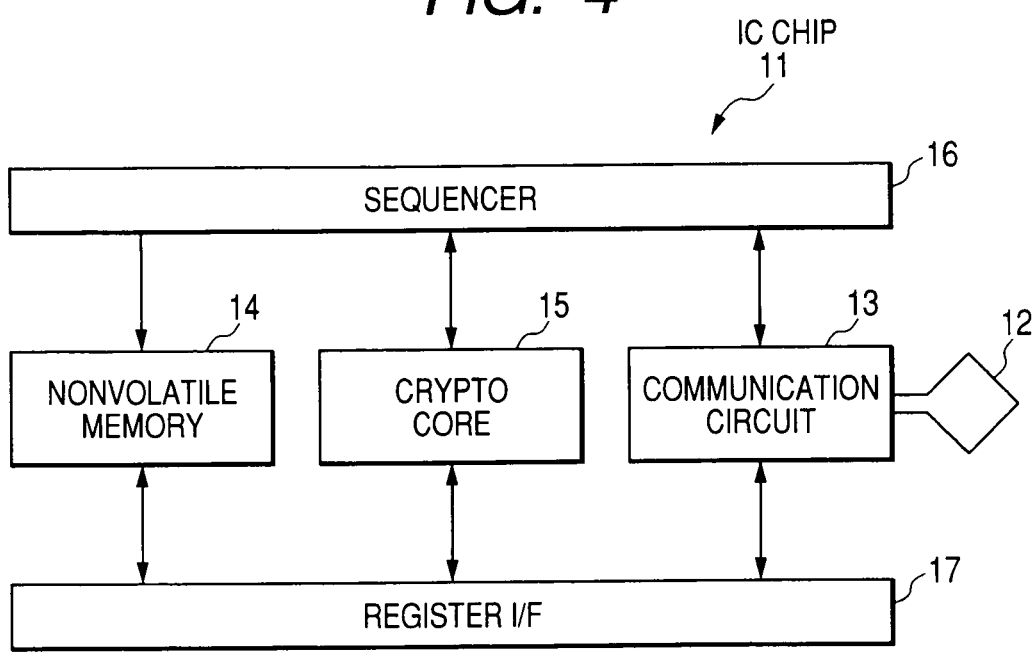
FIG. 4 is a block diagram showing an example of a structure of an IC chip that has a function for mutual authentication.

An example of the function for mutual authentication between the IC chip 11 and the information processing apparatus 1 will be explained. FIG. 4 is a block diagram showing an example of a structure of an IC chip that has the function for mutual authentication.

As shown in FIG. 4, the IC chip 11 includes a communication circuit 13, a nonvolatile memory 14, an crypto core processing unit 15, a sequencer 16, and a register I/F 17. The antenna 12 is connected to the communication circuit 13.

The communication circuit 13 is a circuit for transmitting and receiving data to and from the IC chip R/W 5 in a non-contact manner via the antenna 12. The communication circuit 13 performs modulation and demodulation of transmission and reception data, data processing complying with a communication protocol, and the like. The communication circuit 13 may have a function for receiving a radio wave from the IC chip R/W 5 and transmitting electric power generated in the antenna 12 to the inside of the circuit. In the nonvolatile memory 14, key information for authentication (an authentication key), identification information for a software file described later, key information for installation, usage control information, and the like are stored. A common key and an initial value for encryption by the crypto core processing unit 15, a temporary value for random number generation, and the like are also stored in the nonvolatile memory 14. Necessary information among these pieces of information may be stored in an unrewritable state.

The crypto core processing unit 15 executes encryption processing by a common key in which an encryption system such as the DES (Data Encryption Standard) or the AES (Advanced Encryption Standard) is used. The crypto core processing unit 15 performs, using data stored in the nonvolatile memory 14, generation of data indicating a transmission right called token and a random number and encryption and decryption of data transmitted and received to and from the outside via the communication circuit 13. The sequencer 16 collectively controls the respective blocks in the IC chip 11. The sequencer 16 also performs coincidence judgment for random numbers at the time of authentication processing. The register I/F 17 temporarily holds data to be processed in the crypto core processing unit 15 and the communication circuit 13.

Figure 5:
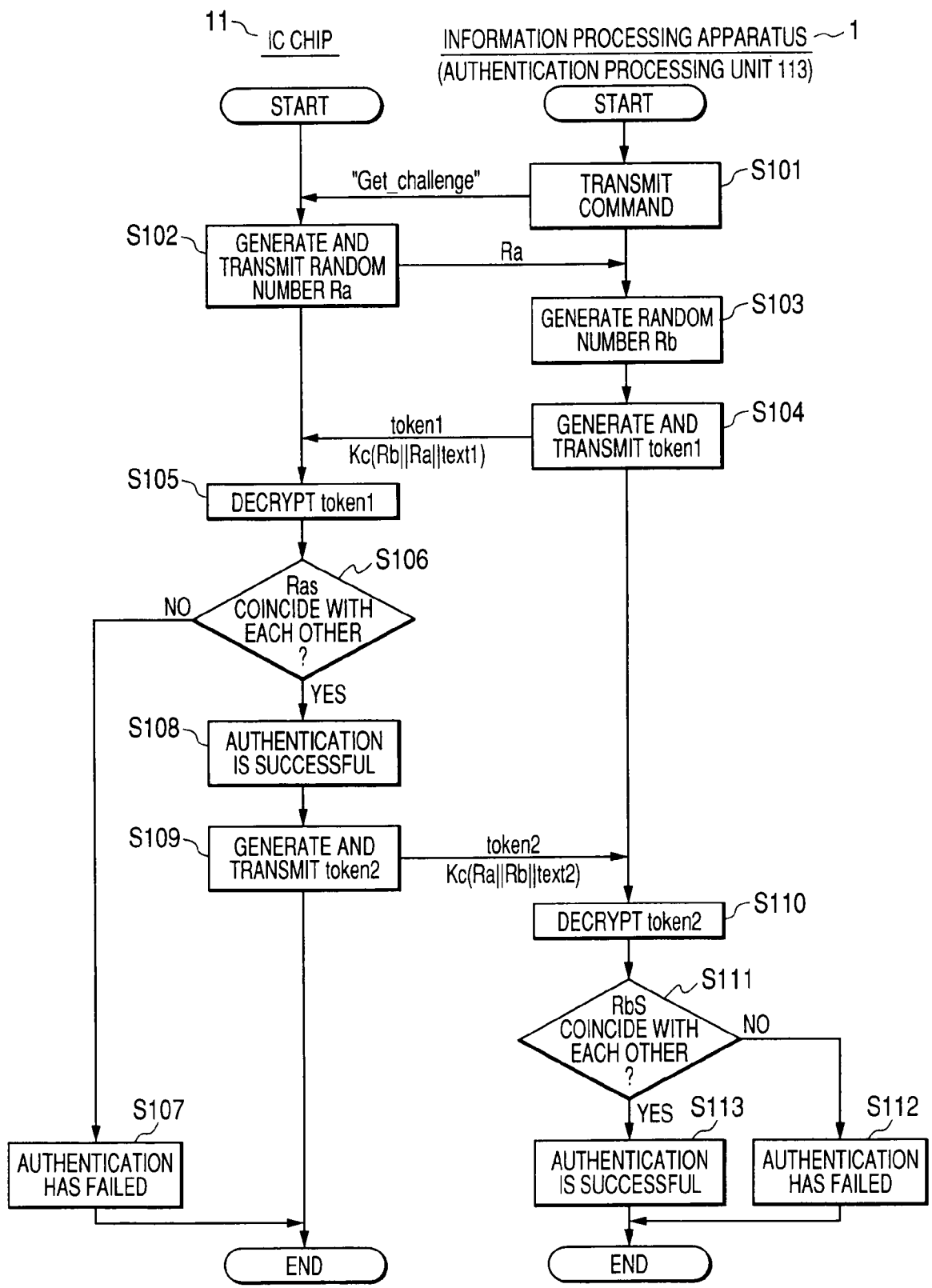
FIG. 5 is a diagram showing an example of a mutual authentication processing sequence between the IC chip and the information processing apparatus.

FIG. 5 is a diagram showing an example of a sequence of the mutual authentication processing between the IC chip and the information processing apparatus.

[Step S101] In the information processing apparatus 1, when the mutual authentication processing is requested from the installation processing unit 111 or the like, the authentication processing unit 113 transmits a command "Get_challenge" for starting the mutual authentication processing to the IC chip 11.

[Step S102] The IC chip 11 having received the command generates a random number (Ra) and transmits the random number to the authentication processing unit 113.

[Step S103] The authentication processing unit 113 having received the random number Ra generates a random number (Rb). The authentication processing unit 113 also generates "text1" as a temporary numerical value.

[Step S104] The authentication processing unit 113 generates a value obtained by combining the random number Rb generated, "text1", and the random number Ra from the IC chip 11 (Rb||Ra||text1). The authentication processing unit 113 transmits a value obtained by encrypting this value with an authentication key Kc serving as a common key to the IC chip 11 as a token (token 1). The authentication key Kc is stored in, for example, the HDD 104 or the ROM 102 in the information processing apparatus 1 in advance.

[Step S105] The IC chip 11 receives "token1" from the authentication processing unit 113 and decrypts "token1" with the authentication key Kc to extract the random number Ra.

[Step S106] The IC chip 11 compares the random number extracted and the random number generated in step S102.

[Step S107] When the random numbers do not coincide with each other in step S106, the IC chip 11 judges that authentication has failed and ends the processing.

[Step S108] When the random numbers coincide with each other in step S106, the IC chip 11 judges that the IC chip 11 side has correctly authenticated the authentication processing unit 113.

[Step S109] The IC chip 11 generates "text2" as a temporary numerical value, generates a value obtained by combining "text2", the random number Rb extracted from "token1", and the random number Ra (Ra||Rb||text2), encrypts this value with the authentication key Kc, and transmits the value encrypted to the authentication processing unit 113 as a token (token2). The authentication key Kc is stored in the nonvolatile memory 14 in the IC chip 11 in advance.

[Step S110] The authentication processing unit 113 receives "token2" from the IC chip 11 and decrypts "token2" with the authentication key Kc to extract the random number Rb.

[Step S111] The authentication processing unit 113 compares the random number extracted and the random number generated in step S103.

[Step S112] When the random numbers do not coincide with each other in step S111, the authentication processing unit 113 judges that authentication has failed and ends the processing.

[Step S113] When the random numbers coincide with each other in step S111, the authentication processing unit 113 judges that the authentication processing unit 113 side has correctly authenticated the IC chip 11. Consequently, mutual authentication correctly ends.

In step S104, in acquiring information recorded in the IC chip 11, the authentication processing unit 113 may generate a temporary common key from "text1" and "text2", which are temporary values, encrypt the information using this common key, and transmit the information encrypted. This makes it possible to more safely transfer the recorded information in the IC chip 11. In the above description, the authentication processing of the common key system is applied. However, authentication processing is not limited to this. For example, a public key or the like of an authentication authority may be stored in the IC chip 11 to perform mutual authentication with the authentication processing unit 113 of the information processing apparatus 1 according to the public key system.

Figure 6:
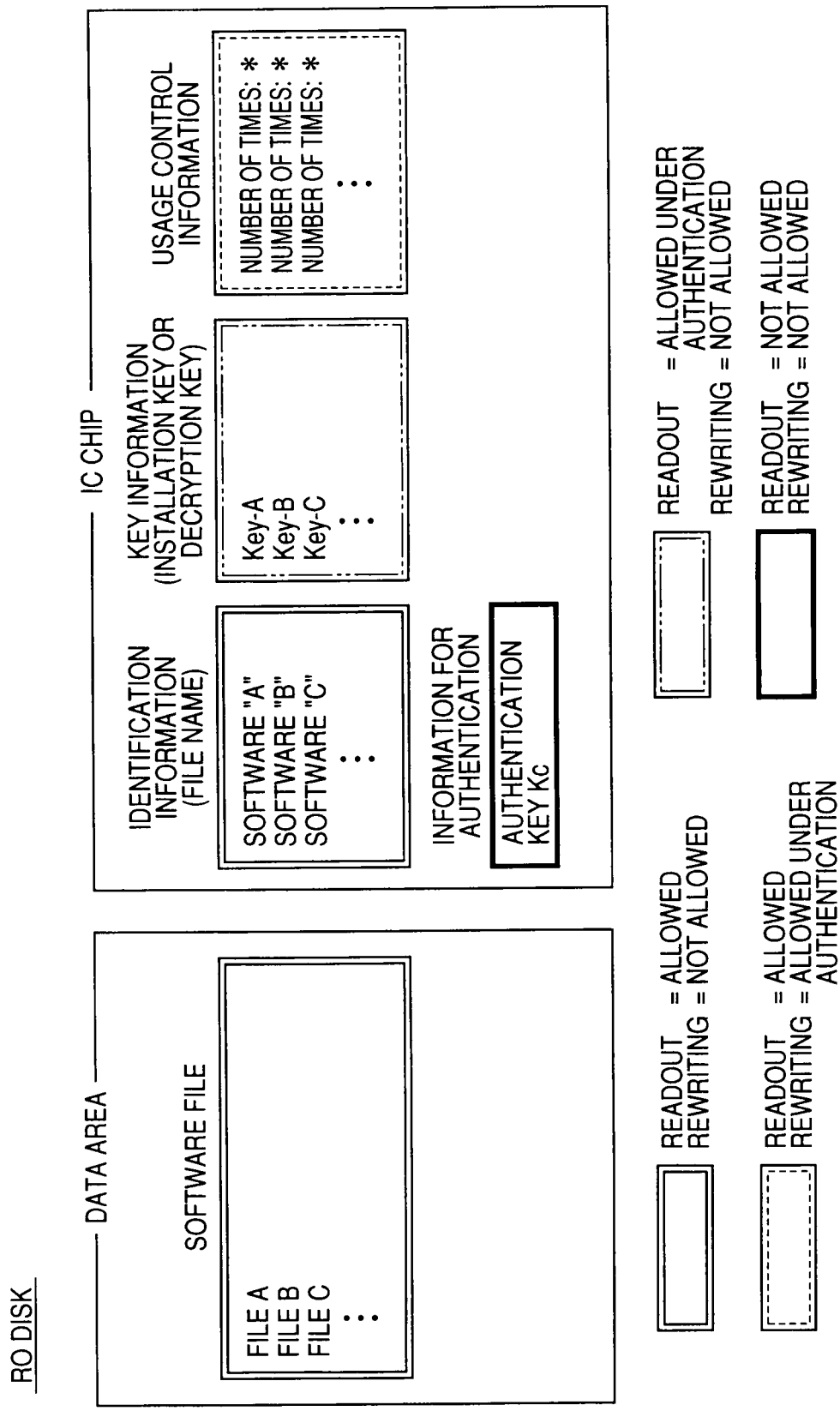
FIG. 6 is a diagram showing an RO disk used in the first embodiment and information recorded in an IC chip of the RO disk.

A procedure for software installation will be specifically explained. FIG. 6 is a diagram showing a RO disk and information recorded in an IC chip of the RO disk.

When software is provided using the RO disk as the optical disk 10, one or plural software files are recorded in the data area of the optical disk 10 in an unrewritable state. Identification information (e.g., file names) corresponding to the respective software files recorded in the data area, key information (installation keys or decryption keys) corresponding to the respective software files, and usage control information are recorded in the IC chip 11 of the optical disk 10. The authentication key Kc is also recorded in the IC chip 11 as information necessary for the mutual authentication processing.

In the case of the RO disk, software files on the data area are unrewritable. Thus, identification information of software files corresponding thereto is also recorded in the IC chip 11 in an unrewritable state. The identification information are readable from the outside without specifically performing the mutual authentication processing to allow the user to easily check content of the identification information.

In order to prevent the key information from being read by an illegal tool and software corresponding thereto from being illegally installed, the key information in the IC chip 11 is readable from the outside only when the mutual authentication processing is correctly executed. Since it is necessary that association with the software files in the data area is maintained, rewriting of the key information is difficult.

The usage control information is information indicating how many times a software file corresponding thereto can be installed in future. The usage control information is readable from the outside without performing the mutual authentication processing to allow the user to easily check the content. In order to prevent usage information from being falsified by an illegal tool and software corresponding thereto from being illegally installed many times, the usage control information is rewritable only when the mutual authentication processing is correctly executed. The usage control information is not limited to such information indicating the number of times a software file can be installed and may be, for example, information simply indicating possibility of installation.

Since the authentication key Kc is used only in the IC chip 11 at the time of the mutual authentication processing, it is difficult to read out or rewrite the authentication key Kc from the outside. The mutual authentication processing may also be necessary for the identification information and the usage control information at the time of readout.

Figure 7:
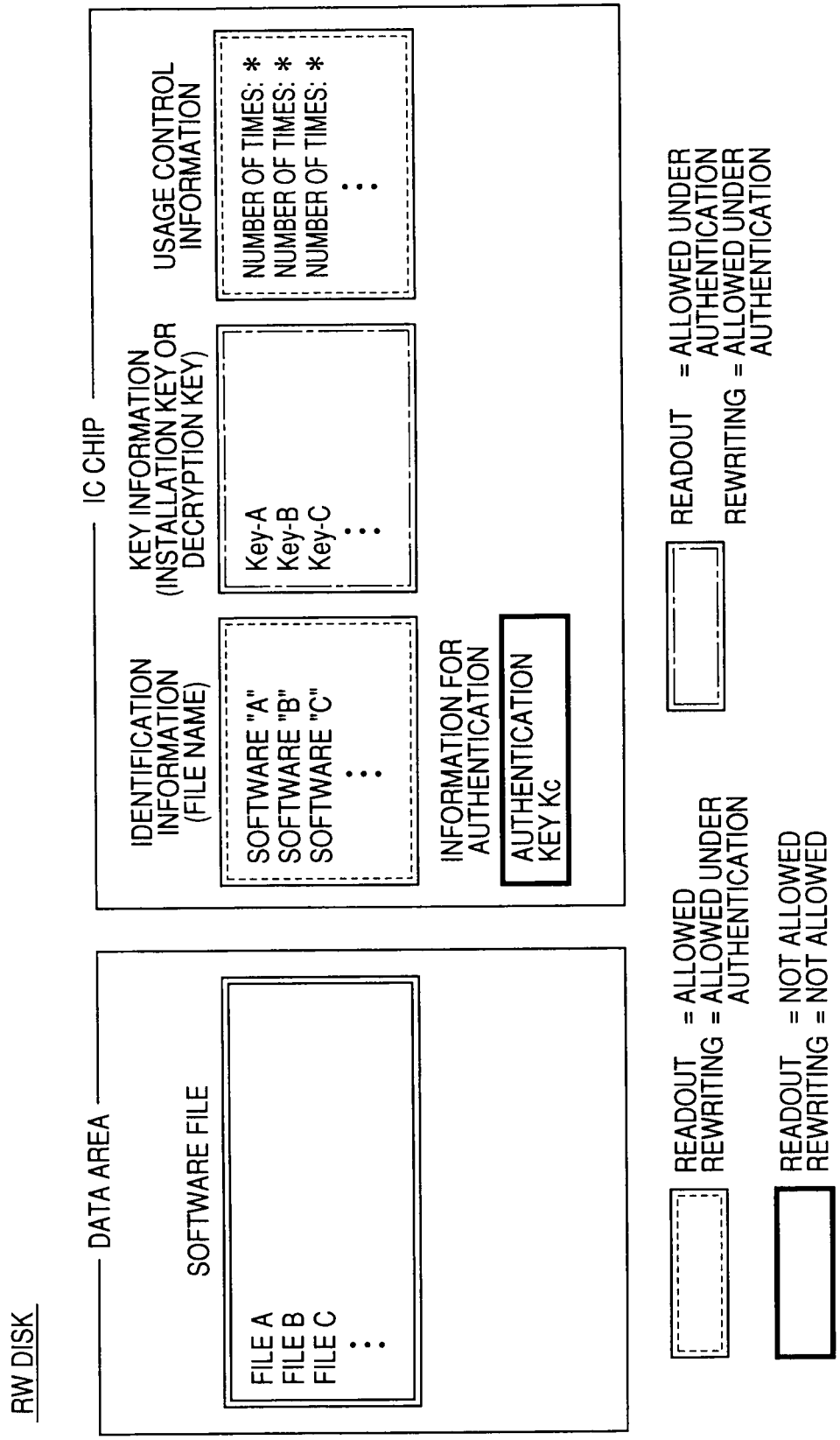
FIG. 7 is a diagram showing an RW disk used in the first embodiment and information recorded in an IC chip of the RW disk.

FIG. 7 is a diagram showing an RW disk and information recorded in an IC chip of the RW disk.

Even when software is provided using the RW disk as the optical disk 10, information recorded in the IC chip 11 is the same as information recorded in the RO disk. However, since one or plural software files are recorded in the data area of the optical disk 10 in a rewritable state, it is also possible to rewrite all the pieces of information in the IC chip 11 corresponding to these software files from the outside. In order to prevent falsification of the information, the mutual authentication processing is necessary for rewriting of the information. It is possible to read out identification information and usage control information of the software files from the outside without performing the mutual authentication processing. It is possible to read out key information (installation keys or decryption keys) from the outside only when the mutual authentication processing is correctly executed. As in the case of the RO disk, the mutual authentication processing may be necessary for the identification information and the usage control information at the time of readout.

Figure 8:
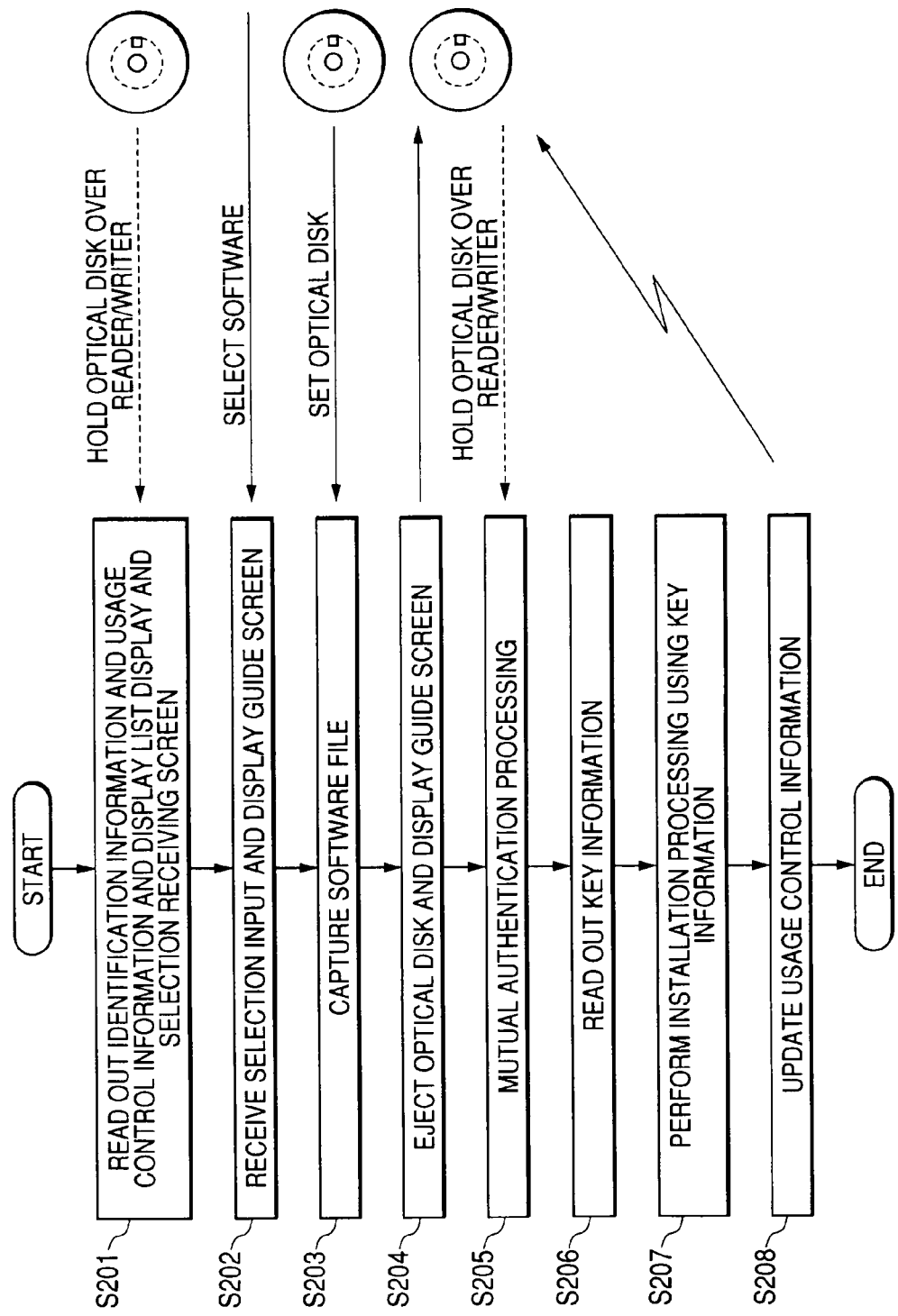
FIG. 8 is a flowchart showing a processing procedure at the time of software installation in the information processing apparatus according to the first embodiment.

FIG. 8 is a flowchart showing a processing procedure of the information processing apparatus at the time of software installation. In this flowchart, for reference, an operation procedure of a user is also described.

[Step S201] First, a user holds the optical disk 10 having recorded therein software, which the user wishes to install, over the IC chip R/W 5 connected to the information processing apparatus 1. In the information processing apparatus 1 in which the installation program is executed by the CPU 101, identification information of software files recorded in the IC chip 11 and usage control information corresponding to the software files are read out by the IC chip R/W 5 according to a request of the installation processing unit 111. The installation processing unit 111 receives the information read out via the authentication processing unit 113. The installation processing unit 111 causes the display 2 to display a list display screen showing a list of file names of the software files recorded in the optical disk 10 and content of the usage control information corresponding to the respective files.

[Step S202] The user can check, with reference to the list display screen displayed, whether desired software can be installed. When the number of times the desired software can be installed is one or more, the user performs input operation for selecting a software file corresponding to the desired software file. The installation processing unit 111 of the information processing apparatus 1 receives the selection input and recognizes the software file selected. Subsequently, the installation processing unit 111 causes the display 2 to display a guide screen for urging the user to set the optical disk 10.

[Step S203] The user sets the optical disk 10 on the disk tray of the information processing apparatus 1 in accordance with the guide screen to cause the information processing apparatus 1 to load the optical disk 10. The installation processing unit 111 causes the optical disk drive 4 to execute reading of the software file selected in step S202 from the data area of the optical disk 10. The installation processing unit 111 captures the software file read and causes, for example, the HDD 104 to store the software file.

[Step S204] The installation processing unit 111 causes the optical disk drive 4 to eject the optical disk 10 and causes the display 2 to display the guide screen for urging the user to hold the optical disk 10 over the IC chip R/W 5 again.

[Step S205] The user removes the optical disk 10 from the optical disk drive 4 and, then, holds the optical disk 10 over the IC chip R/W 5. The authentication processing unit 113 executes the mutual authentication processing with the IC chip 11 according to a request from the installation processing unit 111.

A procedure of this processing is as explained with reference to FIG. 5.

[Step S206] When the mutual authentication processing with the IC chip 11 is correctly executed, the authentication processing unit 113 reads out key information corresponding to the software file selected in step S202 from the IC chip 11 via the IC chip R/W 5 and supplies the key information to the installation processing unit 111.

[Step S207] The installation processing unit 111 executes installation processing for the software file captured in step S203 using the key information supplied. For example, when the software file is a self-extraction file, after applying the key information (an installation key) to execute self-extraction processing, the installation processing unit 111 incorporates various program modules and the like after decompression in the information processing apparatus 1 and performs necessary setting and the like. When the software file is encrypted, the installation processing unit 111 supplies the key information (a decryption key) to the crypto processing unit 112 to cause the crypto processing unit 112 to execute decryption processing for the software file and executes the same processing such as incorporation of the various program modules decrypted and setting. The decryption key may be directly supplied to the crypto processing unit 112 without being supplied from the authentication processing unit 113 to the installation processing unit 111 in step S206.

[Step S208] The installation processing unit 111 accesses the IC chip 11 via the authentication processing unit 113 and the IC chip R/W 5 and rewrites usage control information corresponding to the software file to reduce the number of times the software file can be installed by one. This information rewriting is performed in a state in which the mutual authentication in step S205 is established. Actually, for example, the information rewriting is executed simultaneously with start of the installation processing in step S207 following the readout of the key information in step S206.

Figure 9:
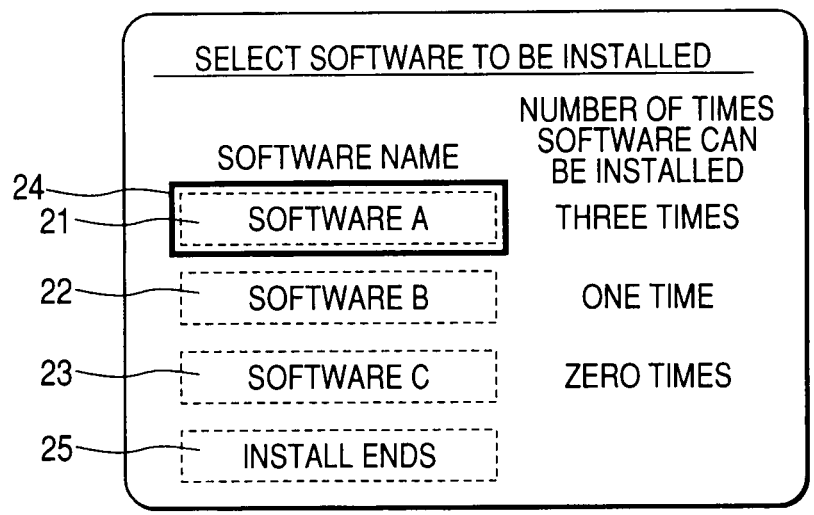
FIG. 9 is a diagram showing an example of display of a list display screen for selecting software to be installed.

FIG. 9 is a diagram showing an example of display of a list display screen for selecting software to be installed.

In the list display screen displayed on the display 2 in step S201 in FIG. 8, for example, as shown in FIG. 9, a list of icons 21 to 23 indicating software names corresponding to the software files recorded in the optical disk 10 and the numbers of times respective kinds of software can be installed, which is based on usage control corresponding to the respective kinds of software are displayed. It is possible to select software that the user wishes to install by moving a cursor 24 according to operation input of the user. On the basis of the display of the number of times software can be installed, when it is difficult to further install software that the user wishes to install, it is also possible to select an end icon 25 not to start installation processing.

Therefore, for example, the user does not perform unnecessary operation for inserting the optical disk 10 having stored therein a file of desired software in the information processing apparatus 1 regardless of the fact that installation of desired software is difficult. At a point before reading recorded information in the data area, it is possible not only to check content of the optical disk 10 but also to select software to be installed. This makes it possible to surely install desired software without causing confusion of operation. Thus, convenience for the user is improved.

Figure 10A:
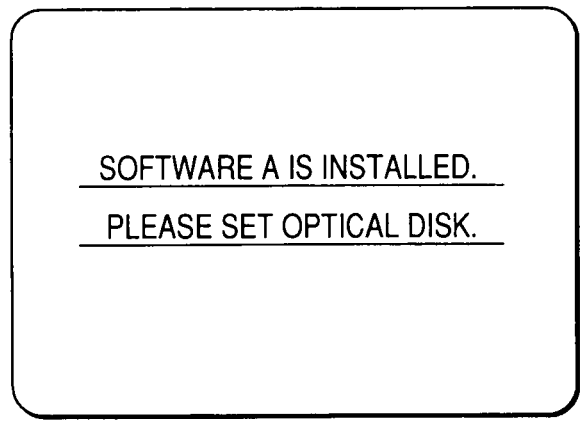
FIGS. 10A and 10B are diagrams showing examples of display on various guide screens during installation processing.
Figure 10B:
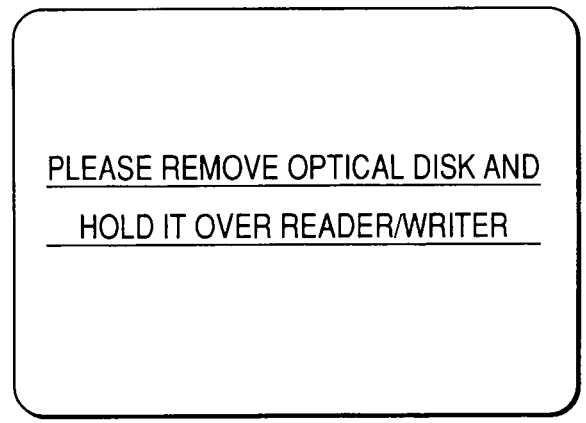

FIGS. 10A and 10B are diagrams showing examples of display of various guide screens during installation processing.

FIG. 10A is a screen for urging the user to set the optical disk 10 on the optical disk drive 4 in step S202 in FIG. 8. FIG. 10B is a screen for urging the user to hold the ejected optical disk 10 over the IC chip R/W 5 in step S204 in FIG. 8. By displaying such guide screens, even when the IC chip R/W 5 is provided outside the optical disk drive 4, the user can operate the information processing apparatus 1 without confusion to correctly complete installation.

Figure 11A:
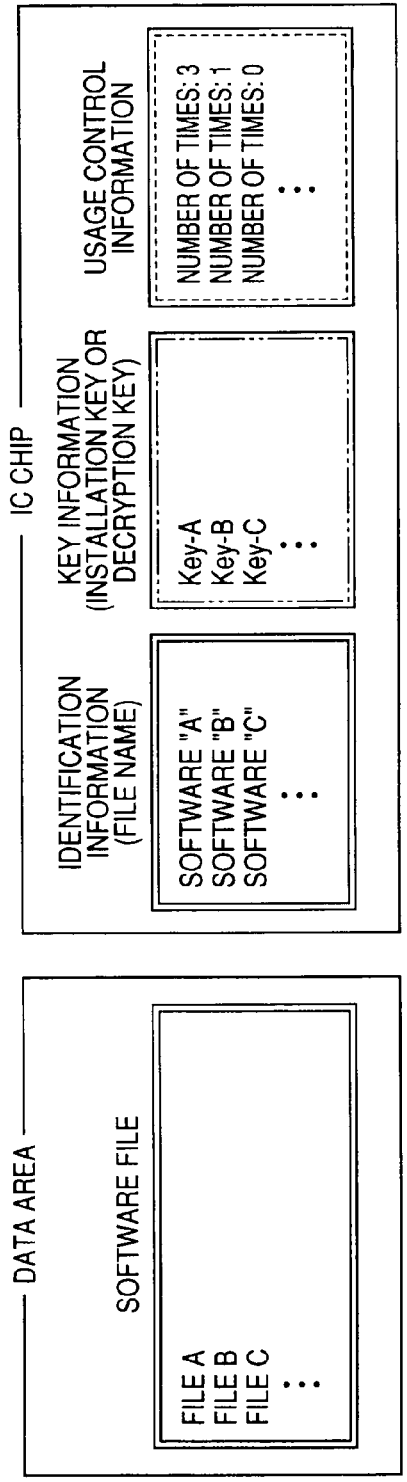
FIGS. 11A and 11B are diagrams showing an example of a change in a data area and recorded information in an IC chip at the time when software recorded in an optical disk is installed.
Figure 11B:
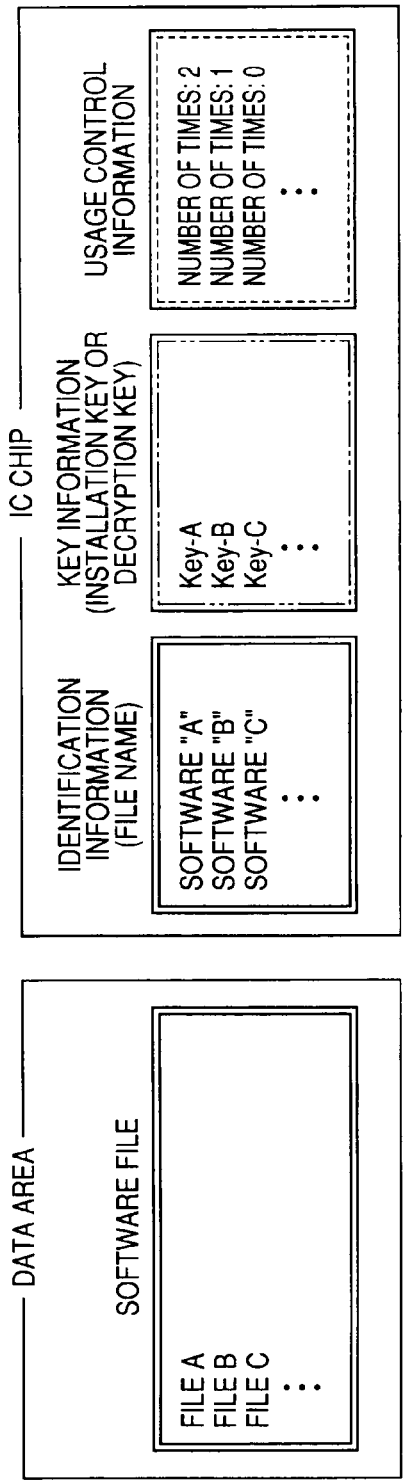

FIGS. 11A and 11B are diagrams showing an example of a change in a data area and recorded information in an IC chip at the time when software recorded in an optical disk is installed.

When, for example, a "software file A" among respective pieces of recorded information shown in FIG. 11A is installed in the information processing apparatus 1 according to the procedure described above, as shown in FIG. 11B, in usage control information corresponding to the software file A, the number of times the software file A can be installed is reduced from "3" to "2".

Figure 12A:
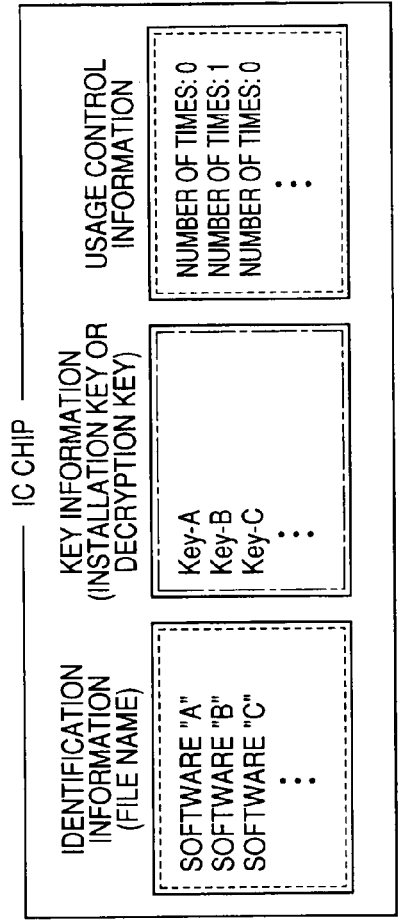
FIGS. 12A and 12B are diagrams showing an example of a change in the data area and the recorded information in the IC chip at the time when software files recorded in the RW disk are rewritten.
Figure 12B:
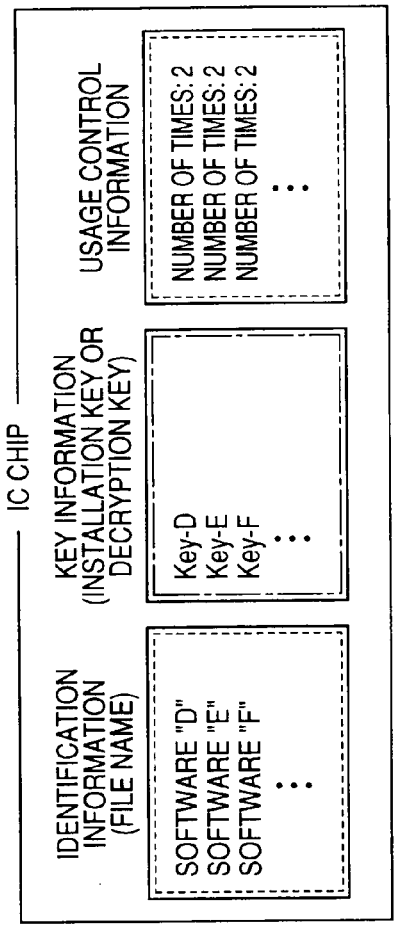

FIGS. 12A and 12B are diagrams showing an example of a change in the data area and the recorded information in the IC chip at the time when software files recorded in an RW disk are rewritten.

In the case of the RW disk, it is also possible to rewrite the software files in the data area. In the example in FIGS. 12A and 12B, all of three software files A, B, and C recorded in the data area as shown in FIG. 12A are erased and other three software files D, E, and F are written anew as shown in FIG. 12B. In this case, it is possible to rewrite the identification information, the key information, and the usage control information in the IC chip 11 to information corresponding to the new software files only when the information processing apparatus 1 legally acquires a right for allowing the user to install the software files a predetermined number of times according to input of an ID or the like indicating that the software files are legally purchased and the mutual authentication processing with IC chip 11 is correctly executed. The software files may be erased or written one by one.

In this way, the software files and information in the IC chip 11 related to the software files are made rewritable. Consequently, for example, when it is difficult to install software in the data area, it is possible to record, without wasting a storage capacity of the RW disk, new software in a state in which the copyright is protected. When encryption is necessary in writing software files in the RW disk, after encrypting the software files using the encryption processing function of the installation program (i.e., the crypto processing unit 112), the software files only have to be recorded in the data area of the optical disk 10.

As explained above, the installation program is executed in the information processing apparatus 1 at the time of installation of software in the optical disk 10. This makes it possible to surely prevent the software from being illegally installed. The user can correctly complete the installation with simple operation without causing confusion.

The IC chip 11, copy of which is extremely difficult, is mounted on the optical disk 10 and key information recorded in the IC chip 11 is made readable only after mutual authentication to make it difficult to install a software file corresponding to the key information in the data area of the optical disk 10 unless the key information is used. This makes it difficult to, when data in the data area is copied to other recording media bit by bit, illegally use (i.e., install) the data. Usage control information that is rewritable only after mutual authentication is recorded in the IC chip 11 and the number of times software can be used is reduced when the software is installed. This makes it possible to safely manage the number of times of installation of the software. Therefore, it is possible to surely protect the copyright of the software and to surely manage the state of usage of the software.

The number of times of inserting operation of the optical disk 10 in the information processing apparatus 1 by the user is limited to one, the number of times the user holds the optical disk 10 over the IC chip R/W 5 is limited to two, the user is allowed to select installable software before inserting the optical disk 10, and various screens for guiding operation after the selection are sequentially displayed. Consequently, in systems with various constitutions including the system in which the IC chip R/W 5 is provided outside the optical disk drive 4 as described above, the user can operate the system without confusion and correctly complete installation.

In the data area in the optical disk 10, software files are simply recorded and a program and the like for realizing the installation procedure are not specifically recorded. Thus, it is possible to provide a system with improved convenience for the user using only the functions on the information processing apparatus 1 side. Therefore, it is possible to reduce burdens of development expenses, manufacturing costs, and the like on a software provider side. It is also possible to realize both copyright protection for software and convenience for the user without specifically changing a recording format or the like for the data area and using an unnecessary storage area in the data area.

Second Embodiment

Figure 13:
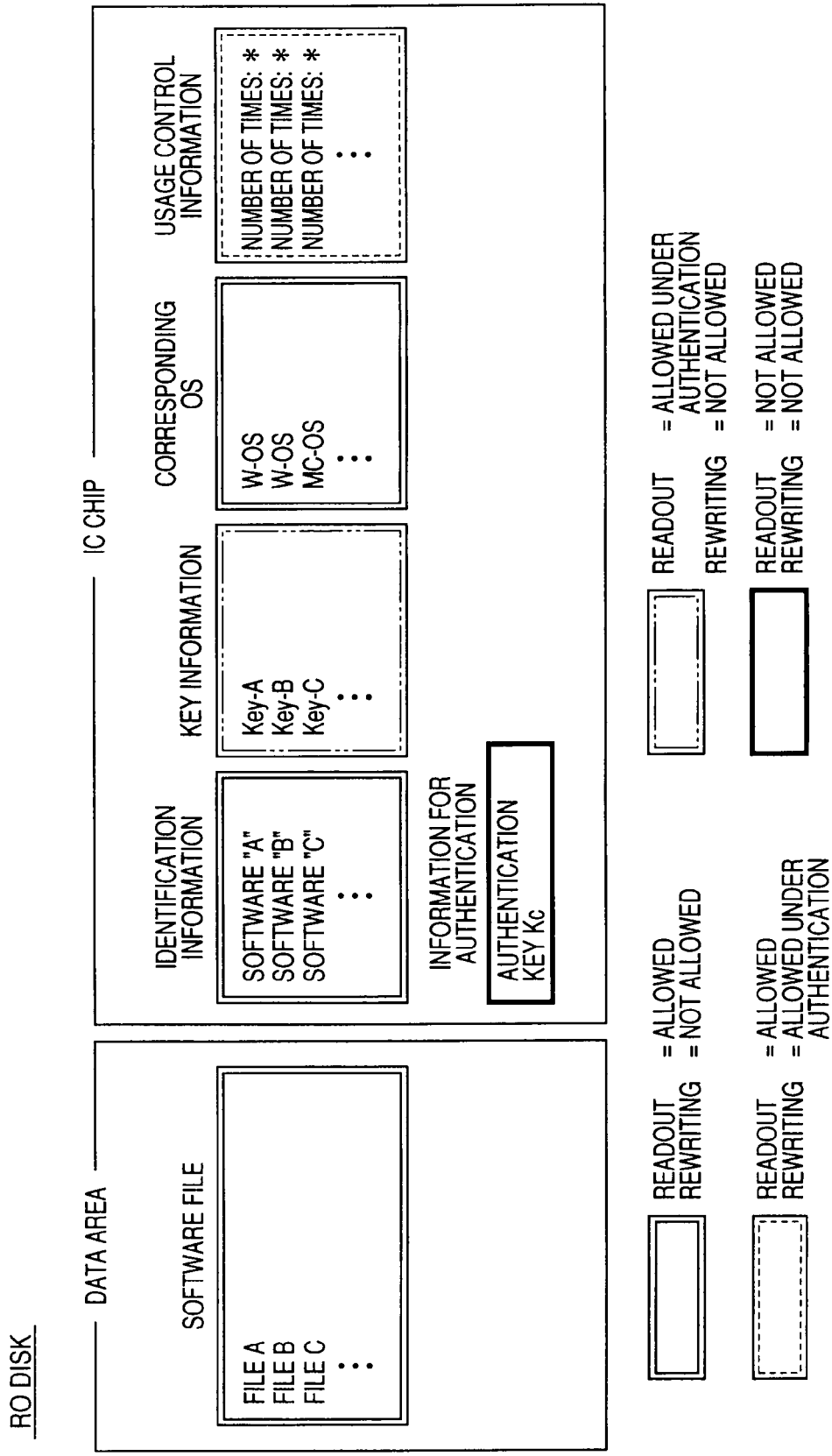
FIG. 13 is a diagram showing an example of an optical disk used in a second embodiment of the invention and information recorded in an IC chip of the optical disk.

FIG. 13 is a diagram showing an example of an optical disk used in a second embodiment of the invention and information recorded in an IC chip of the optical disk. Although information recorded in the RO disk is shown as an example, the same information is recorded in the RW disk.

In this embodiment, in addition to the information recorded in the first embodiment, installation environment information indicating an environment of a device or software capable of installing software files corresponding to the information is recorded in the IC chip 11. As such information, for example, it is possible to apply types of CPUs, types and manufacture names of computers, types and versions of OSs, and the like capable of installing the software files. In FIG. 13, as an example, types of OSs capable of installing the software files are stated.

Such installation environment information is readable from the outside without mutual authentication in the same manner as the identification information and the usage control information of the software files. The installation environment information is unrewritable in the RO disk and is rewritable in the RW disk only when the mutual authentication processing is correctly executed in the same manner as the file names, the identification information, and the like.

For example, in step S201 in FIG. 8, the installation environment information is read together with the identification information and the usage control information, according to states of the devices and the software of the information processing apparatus 1, only installable software files are selected and displayed on the list display screen. In FIG. 13, when "W-OS" is installed as an OS in the information processing apparatus 1, in step S201, the information processing apparatus 1 selects only software files A and B, displays the file names on the list display screen, and causes the user to select a software file. Consequently, it is possible to show only information of installable software to the user and cause the user to install the software without making the user aware that the user is installing the software. For example, when the same kinds of software with different corresponding OSs are provided to the user with the same optical disk 10, it is possible to cause the user to surely install only the software corresponding to the OS installed in the information processing apparatus 1. It is also possible to prevent a situation in which the user selects uninstallable software and unnecessary processing is executed.

Third Embodiment

Figure 14:
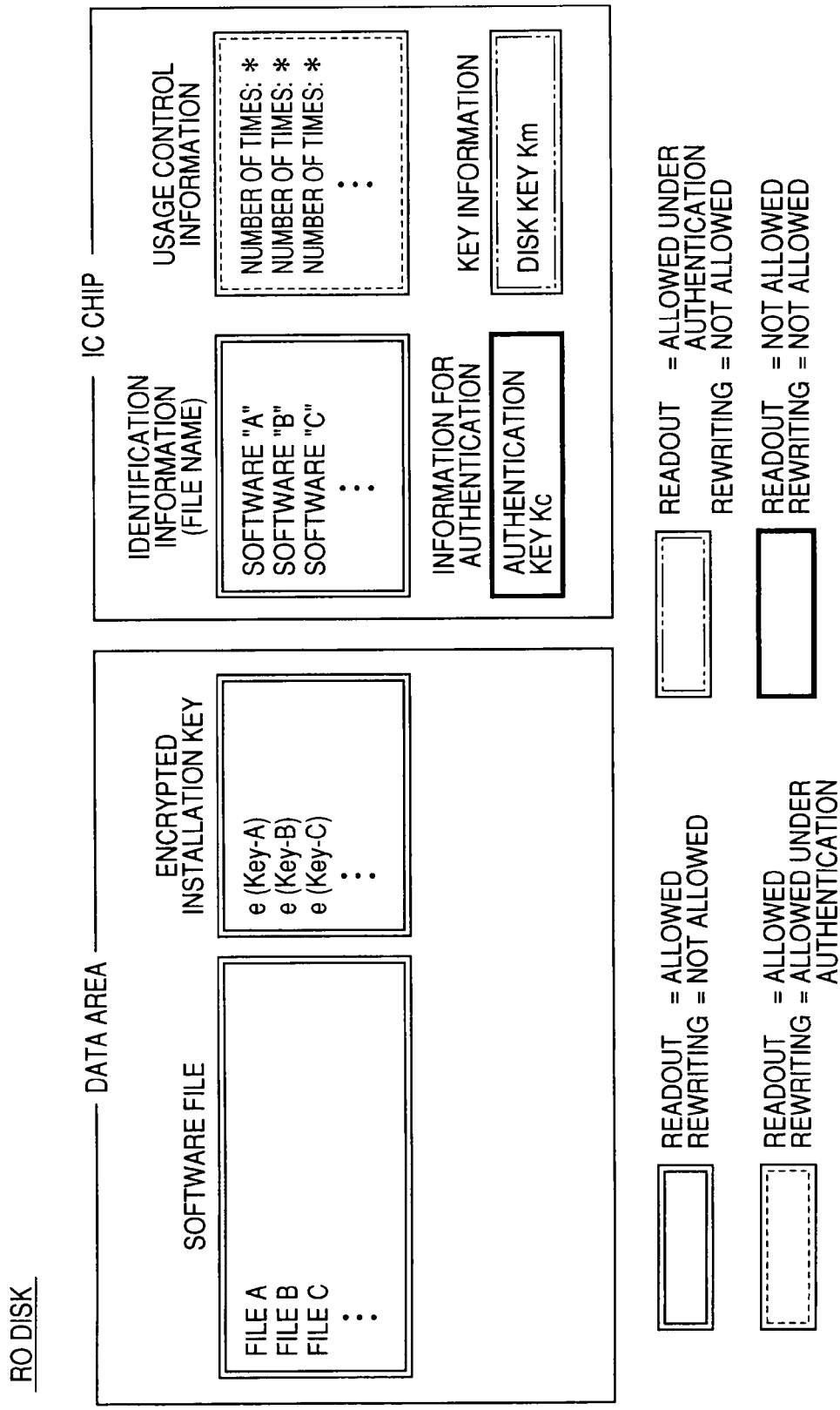
FIG. 14 is a diagram showing an example of an optical disk used in a third embodiment of the invention and information recorded in an IC chip of the optical disk.

FIG. 14 is a diagram showing an example of an optical disk used in a third embodiment of the invention and information recorded in an IC chip of the optical disk. Although information recorded in the RO disk is shown as an example, the same information is recorded in the RW disk.

In this embodiment, together with software files, installation keys necessary for installing the software files are recorded in the data area of the optical disk 10 in a state in which the installation keys are encrypted by a disk key Km peculiar to the disk. The disk key Km is recorded in the IC chip 11 and read out and used for decrypting the installation keys at the time of installation of the software files. The disk key Km is readable only when the mutual authentication processing is correctly executed and is unrewritable.

In this embodiment, compared with the first and the second embodiments, when plural software files are recorded in the data area, it is unnecessary to record an installation key for each of the files in the IC chip 11 and only the disk key Km has to be recorded as key information. Therefore, it is possible to reduce a storage capacity necessary for the IC chip 11 and reduce manufacturing costs for the IC chip 11. Alternatively, it is possible to further record other information concerning software such as metadata of the software in the IC chip 11. This makes it possible to, for example, display the information at the time of installation of the software.

Figure 15:
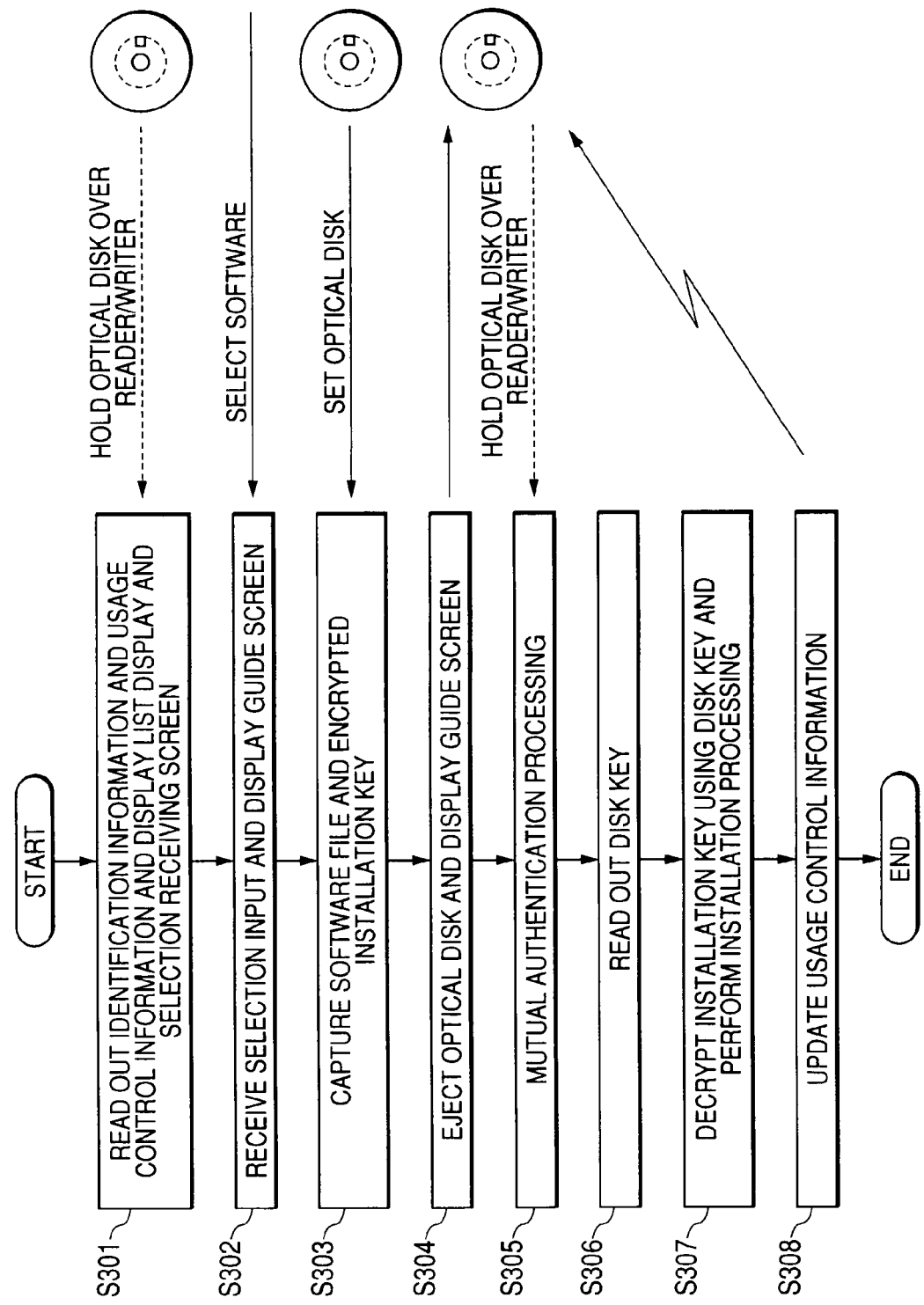
FIG. 15 is a flowchart showing a processing procedure at the time of software installation in an information processing apparatus according to the third embodiment.

FIG. 15 is a flowchart showing a processing procedure at the time of software installation in an information processing apparatus according to the third embodiment. In this flowchart, for reference, an operation procedure of a user is also described.

[Steps S301 to S302] In these steps, the same processing as steps S201 to S202 in FIG. 8 is performed. The information processing apparatus 1 reads out identification information and usage control information of software files from the IC chip 11 and displays a list display screen indicating a list of file names of the software files recorded in the optical disk 10 and content of usage control information corresponding to the file names on the display 2. The user selects desired software from the list display screen. The information processing apparatus 1 receives a selection input from the user and displays a guide screen for causing the user to set the optical disk 10.

[Step S303] When the optical disk 10 is set in the optical disk drive 4 by the user, the installation processing unit 111 of the information processing apparatus 1 captures the software file selected in step S302 and an encrypted installation key corresponding to the software file from the data area of the optical disk 10 via the optical disk drive 4 and causes the HDD 104 or the like to store the software file and the installation key.

[Step S304] The installation processing unit 111 causes the optical disk drive 4 to eject the optical disk 10 and causes the display 2 to display the guide screen for urging the user to hold the optical disk 10 over the IC chip R/W 5 again.

[Step S305] The user removes the optical disk 10 from the optical disk drive 4 and holds the optical disk 10 over the IC chip R/W 5. The authentication processing unit 113 executes the mutual authentication processing with the IC chip 11 according to a request from the installation processing unit 111.

[Step S306] The authentication processing unit 113 reads out, when the mutual authentication processing with the IC chip 11 is correctly executed, the disk key Km from the IC chip 11 via the IC chip R/W 5.

[Step S307] The crypto processing unit 112 decrypts the installation key read out in step S303 using the disk key Km read out. The installation processing unit 111 executes installation processing for the software file read in step S303 using the installation key decrypted.

[Step S308] The installation processing unit 111 accesses the IC chip 11 via the authentication processing unit 113 and the IC chip R/W 5 and rewrites usage control information corresponding to the software file to reduce the number of times the software file can be installed by one. As in the case of FIG. 8, this information rewriting is performed in a state in which the mutual authentication in step S305 is established. Actually, for example, the information rewriting is executed simultaneously with start of the installation processing in step S307 following the readout of the key information in step S306.

According to the processing procedure described above, illegal installation of software is prevented and it is possible to correctly complete installation with simple operation without causing confusion of the user. It is difficult to install the software files in the optical disk 10 unless the installation keys in the data area are decrypted and used. Thus, even if the data in the data area is copied bit by bit, it is difficult to install the software files from a recording medium at a copy destination. The disk key Km for decrypting the installation keys is recorded in the IC chip 11 and it is difficult to read out the disk key Km from an illegal device because of the function of mutual authentication. Thus, it is possible to safely manage the disk key Km. By performing the installation according to the procedure, until the installation is completed, the user can accurately operate the information processing apparatus 1 without confusion.

Although the information in the RO disk is shown in FIG. 14, the same information only has to be recorded in the case of the RW disk. In this case, it is possible to read out the software files and the encrypted installation keys in the data area and the identification information in the IC chip 11 without mutual authentication. It is possible to rewrite the software files, the installation keys, and the identification information only when the mutual authentication processing is correctly executed. In adding a software file in the data area, for example, in the information processing apparatus 1, after performing the mutual authentication processing with the IC chip 11, identification information and usage control information corresponding to the file are written in the IC chip 11. Then, the disk key Km in the IC chip 11 is read out and an installation key is encrypted by the crypto processing unit 112 and written in the data area.

In the explanation with reference to FIGS. 14 and 15, an encrypted installation key is recorded in the data area. However, when a software file is encrypted and recorded in the data area, the same effects are obtained by encrypting a decryption key for decrypting the file using the disk key Km and recording the decryption key in the data area. In this case, at the time of installation, the decryption key in the data area is decrypted using the disk key Km read out in step S306 in FIG. 15 and, then, the software file is decrypted by the decryption key, and installation processing is executed.

Fourth Embodiment

Figure 16:
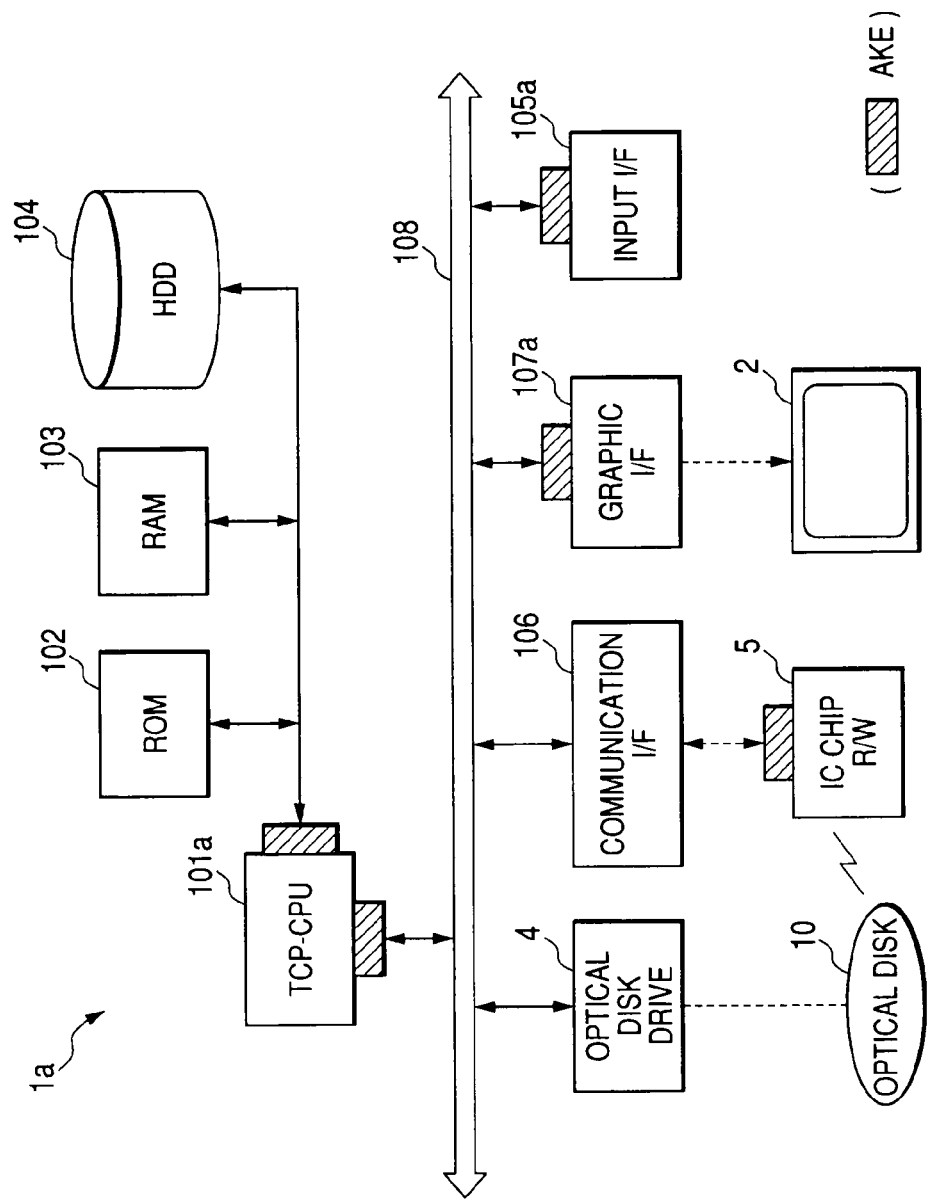
FIG. 16 is a block diagram showing a hardware configuration of an information processing apparatus according to a fourth embodiment of the invention.

FIG. 16 is a block diagram showing a hardware configuration of an information processing apparatus according to a fourth embodiment of the invention. In FIG. 16, functions corresponding to those in FIG. 2 are denoted by the identical reference numerals and signs and explanations of the functions are omitted.

In the embodiments described above, it is possible to prevent illegal installation of software in the optical disk 10 when the CPU that executes the installation program and the IC chip 11 on the optical disk 10 are authenticated as proper devices each other. However, in general, a computer has open specifications and the procedure is realized by execution of software on the open specifications. Thus, it is possible to output confidential information such as key information by using, for example, analysis software. Therefore, it can be said that it is difficult to secure complete security.

An information processing apparatus 1*a* shown in FIG. 16 has a structure with a reinforced protection function against attacks by such execution of illegal software and the like. As a main characteristic of the information processing apparatus 1*a*, a CPU (TCP-CPU) 101*a* conforming to the TCP (Trusted Computing Platform) (or a CPU chip set conforming to the TCP) is used. In the structure in which the TCP-CPU 101*a* is used, the ROM 102, the RAM 103, the HDD 104, and the like are provided in areas separated from the general-purpose internal bus 108. An installation program for realizing an installation procedure including mutual authentication with the IC chip 11 and the like is stored in the areas and the TCP-CPU 101*a* executes the program. Thus, the program is executed safely. Consequently, data stored in the areas are encrypted by a mutual authentication/key exchange (encryption/decryption) function (represented as "AKE" in the figure) of the TCP-CPU 101*a*. Consequently, even when the key information for authentication or the like is leaked, it is possible to secure security of information.

Moreover, a device (a graphic I/F 107*a*) that has the mutual authentication/key exchange function (AKE) is connected to an input/output stage to and from the internal bus 108. The graphic I/F 107*a* performs mutual authentication of devices with the TCP-CPU 101*a* and transmits and receives encrypted data. In the installation processing for the software in the optical disk 10, the IC chip 11 carries out such a mutual authentication/key exchange function (AKE). According to the mutual authentication processing and the transmission and reception of encrypted data, it is possible to perform safe information exchange between the IC chip 11 and the TCP-CPU 101*a*.

It is possible to realize the processing functions explained in the embodiments described above using a computer. In that case, a program describing processing content of functions (an installation processing unit, an crypto processing unit, an authentication processing unit, etc.), which the information processing apparatus should have, is provided. By executing the program with the computer, the processing functions are realized on the computer. It is possible to record the program describing the processing content in a computer-readable recording medium. As the computer-readable recording medium, there are a magnetic recording device, an optical disk, a magneto-optical disk, a semiconductor memory, and the like.

In circulating a program, for example, a portable recording medium such as an optical disk or a semiconductor memory in which the program is recorded is sold. It is also possible to store the program in a storage device of a server computer and transfer the program from the server computer to other computers via a network.

A computer that executes programs stores, for example, the program recorded in the portable recording medium or the program transferred from the server computer in a storage device of the computer. The computer reads the program from the storage device of the computer and executes processing that complies with the program. The computer can also directly read the program from the portable recording medium and execute processing that complies with the program. The computer can also execute, every time the program is transferred to the computer from the server computer, processing that complies with the program received.

It should be understood by those skilled in the art that various modifications, combinations, sub-combinations, and alterations may occur depending on design requirements and the other factors insofar as they are within the scope of the appended claims or the equivalents thereof.

What is claimed is:

1. A recording medium comprising an IC chip, the IC chip being mounted on the recording medium and including circuitry configured to:
   record information;
   transmit and receive information to and from an external apparatus without contacting the external apparatus; and
   communicate with the external apparatus and execute mutual authentication between the IC chip and the external apparatus for permitting access to the recorded information, wherein
   data of one or more kinds of software is recorded using said circuitry,
   at least identification information for respective kinds of software recorded on a recording surface of the recording medium, key information necessary for installation of the respective kinds of software, and usage control information indicating a number of installations available for installation of the respective kinds of software are recorded using said circuitry of the IC chip, said identification information and said usage information being displayed on a display screen to a user prior to said mutual authentication between the IC chip and the external apparatus,
   the key information is readout to the external apparatus only when said mutual authentication is correctly performed between the IC chip and the external apparatus, and
   rewriting of the usage control information, stored using said circuitry of the IC chip, by the external apparatus is allowed only when said mutual authentication is correctly performed between the IC chip and the external apparatus.

2. The recording medium according to claim 1, wherein information recorded on the recording surface is rewritable, and rewriting of the identification information, the key information, and the usage control information by the external apparatus is allowed only when mutual authentication is correctly performed between the IC chip and the external apparatus.

3. The recording medium according to claim 1, wherein the data of the respective kinds of software is recorded on the recording surface as compressed data, and the key information is information for starting decompression processing for the compressed data corresponding to the key information.

4. The recording medium according to claim 1, wherein the data of the respective kinds of software is recorded on the recording surface as encrypted data, and the key information is a decryption key for decrypting the encrypted data corresponding to the key information.

5. The recording medium according to claim 1, wherein installation environment information indicating an environment of a device or software capable of installing the respective kinds of software recorded on the recording surface is further recorded using said circuitry.

6. A recording medium comprising an IC chip, the IC chip being mounted on the recording medium and including circuitry configured to:
   record information;
   transmit and receive information to and from an external apparatus without contacting the external apparatus; and
   communicate with the external apparatus and execute mutual authentication between the IC chip and the external apparatus for permitting access to the recorded information, wherein
   data of one or more kinds of software and encrypted key information obtained by encrypting key information necessary for installation of respective kinds of software are recorded using said circuitry,
   at least identification information for the respective kinds of software recorded on a recording surface of the recording medium, a recording media key including information peculiar to the recording medium for decrypting the encrypted key information recorded on the recording surface of the recording medium, and usage control information indicating a number of installations available for installation of the respective kinds of software are recorded using said circuitry of the IC chip, said identification information and said usage information being displayed on a display screen to a user prior to said mutual authentication between the IC chip and the external apparatus,
   the recording media key is readout to the external apparatus only when said mutual authentication is correctly performed between the IC chip and the external apparatus, and
   rewriting of the usage control information, stored using said circuitry of the IC chip, by the external apparatus is allowed only when said mutual authentication is correctly performed between the IC chip and the external apparatus.

7. The recording medium according to claim 1, wherein the IC chip is connected to an antenna mounted on the recording medium and is configured to receive a radio wave or a magnetic field from the external apparatus through the antenna.

8. The recording medium according to claim 1, wherein said mutual authentication includes generating random numbers, exchanging encrypted random numbers between the IC chip and the external apparatus, and determining whether a decrypted version of the encrypted random numbers correspond to the random numbers.

9. The recording medium according to claim 1, wherein said mutual authentication includes a first authentication performed at the IC chip prior to a second authentication performed at the external apparatus.

* * * * *